(12) United States Patent
Okuyama et al.

(10) Patent No.: US 9,193,286 B2
(45) Date of Patent: Nov. 24, 2015

(54) VEHICLE SEAT

(75) Inventors: Sakae Okuyama, Aichi-ken (JP); Masami Nakane, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 349 days.

(21) Appl. No.: 13/486,307

(22) Filed: Jun. 1, 2012

(65) Prior Publication Data
US 2012/0306256 A1 Dec. 6, 2012

(30) Foreign Application Priority Data

Jun. 6, 2011 (JP) .................................. 2011-126339

(51) Int. Cl.
*A47C 31/02* (2006.01)
*B60N 2/58* (2006.01)
*A47C 7/18* (2006.01)

(52) U.S. Cl.
CPC ................ *B60N 2/5825* (2013.01); *A47C 7/18* (2013.01); *A47C 31/02* (2013.01); *B60N 2/5816* (2013.01); *B60N 2/5841* (2013.01)

(58) Field of Classification Search
USPC ........... 297/218.2, 452.6, 452.62, 218.1, 226, 297/452.59
See application file for complete search history.

(56) References Cited

U.S. PATENT DOCUMENTS

| | | | | |
|---|---|---|---|---|
| 3,649,974 A | * | 3/1972 | Baruth et al. ....................... 5/402 |
| 4,579,389 A | * | 4/1986 | Shimbori et al. .......... 297/452.6 |
| 5,370,444 A | * | 12/1994 | Stulik ....................... 297/284.11 |
| 5,520,438 A | * | 5/1996 | Stulik ....................... 297/284.11 |
| 5,641,552 A | * | 6/1997 | Tillner ........................... 428/102 |
| 8,240,759 B2 | * | 8/2012 | Hobl et al. ................. 297/218.1 |
| 8,522,406 B2 | * | 9/2013 | Voigt ............................... 24/306 |
| 2003/0214161 A1 | | 11/2003 | Seto et al. |
| 2010/0072804 A1 | | 3/2010 | Stauske et al. |
| 2010/0102599 A1 | | 4/2010 | Itou et al. |
| 2010/0181818 A1 | | 7/2010 | Mashimo |
| 2011/0049948 A1 | * | 3/2011 | Hobl et al. ................. 297/218.2 |

FOREIGN PATENT DOCUMENTS

| | | |
|---|---|---|
| CN | 101676144 | 3/2010 |
| CN | 101754925 | 6/2010 |
| CN | 101823451 | 9/2010 |

(Continued)

OTHER PUBLICATIONS

U.S. Appl. No. 13/559,831 to Kousuke Sei et al., which was filed Jul. 27, 2012.
Japan Office action, dated Oct. 21, 2014 along with an English translation thereof.

*Primary Examiner* — David E Allred
(74) *Attorney, Agent, or Firm* — Greenblum & Bernstein, P.L.C.

(57) ABSTRACT

A vehicle seat including: a seat component including, a cushion material forming an outer shape of the vehicle seat, a plurality of groove parts formed to the cushion material and intersecting each other, a corner part formed by intersection of the plurality of groove parts, and a skin material covering the cushion material, wherein the skin material covers the cushion material while a portion of the skin material is engaged inside the plurality of groove parts in a pulled state, wherein the cushion material includes a protruding portion protruding from an external portion of the corner part, and wherein the protruding portion covers the external portion of the corner part and shrinks toward the external portion of the corner part by a pressing force of the skin material engaged inside the plurality of groove parts in the pulled state.

8 Claims, 7 Drawing Sheets

(56) References Cited

FOREIGN PATENT DOCUMENTS

| EP | 1325838 | 7/2003 |
| JP | 02-112147 | 9/1990 |
| JP | 2007-20636 | 2/2007 |
| JP | 2008-073441 | 4/2008 |

* cited by examiner (a)

(b)

(a)

(b)

(a)

(b)

VEHICLE SEAT

CROSS-REFERENCE TO RELATED APPLICATIONS

This application claims priority from Japanese Patent Application No. 2011-126339 filed on Jun. 6, 2011, the entire contents of which are incorporated herein by reference.

TECHNICAL FIELD

Aspects of the present invention relate to a vehicle seat including a skin material, a cushion material and groove parts of the cushion material into which a part of the skin material can be fitted in a pulled state.

BACKGROUND

As an example of such a vehicle seat, related-art shows a vehicle seat including a seat cushion and a seat back (see, JP-A-2007-20636).

In the related-art, the seat cushion includes a cushion material forming an outer shape of the seat and a skin material covering the cushion material. The cushion material is formed with a plurality of groove parts (first groove part, second groove part) into which a portion of the skin material can be fitted in a pulled state. The first groove part extends in a width direction of the seat. Further, the second groove part extends in a front-rear direction of the seat and is configured to intersect perpendicularly with the first groove part.

Further, in the related-art, it is possible to prevent a portion of the skin material from being fallen out by setting a width dimension at an entry portion of each groove part smaller than the width dimension at an inner side thereof. By doing so, the cushion material is covered with the skin material while stably engaging a portion of the skin material in the plurality of groove parts.

Further, linear design lines are exhibited on the surface of the seat cushion by fitting the skin material in the cushion material. Accordingly, it is possible to obtain a vehicle seat having an excellent design.

SUMMARY

However, in the related-art, an excessive tension (pressing force) due to the skin material being fitted into the groove part in a pulled state is liable to be exerted on an intersecting part (corner part) of the first groove part and the second groove part. Accordingly, there are problems that the corner part of the cushion material is greatly crushed, wrinkles are generated on the skin material due to a lack of the reaction force of the cushion material relative to the skin material, or design lines are blurred (appearance is deteriorated).

Aspects of the present invention has been made to solve the above-described problems and an object of the present invention is to provide a vehicle seat in which a portion of the skin material can be fitted into the groove parts in a pulled state while maximally maintaining the appearance of the vehicle seat.

According to an aspect of the invention, there is provided a vehicle seat including: a seat component such as a seat cushion or a seat back, the seat component including, a cushion material forming an outer shape of the vehicle seat, a plurality of groove parts formed to the cushion material and intersecting each other, a corner part formed by intersection of the plurality of groove parts, and a skin material covering the cushion material, wherein the skin material covers the cushion material while a portion of the skin material is engaged inside the plurality of groove parts in a pulled state, wherein the cushion material includes a protruding portion protruding from an external portion of the corner part, and wherein the protruding portion covers the external portion of the corner part and shrinks toward the external portion of the corner part by a pressing force of the skin material engaged inside the plurality of groove parts in the pulled state.

According to another aspect of the invention, there is provided a vehicle seat including: a seat component such as a seat cushion or a seat back, the seat component including: a cushion material having a plurality of groove parts intersecting each other and a corner part defined by intersection of the plurality of groove parts, an engagement part provided inside the groove part, and a skin material covering the cushion material while a portion of the skin material is fitted into the groove part in a pulled state, the skin material engaging with the engagement part, wherein the cushion material includes a protruding portion protruding from an external portion of the corner part, and wherein the protruding portion covers the external portion of the corner part and shrinks toward the external portion of the corner part by a pressing force of the skin material.

According to aspects of the present invention, it is possible to fit a portion of the skin material into the groove parts in a pulled state while maximally maintaining the external part of the vehicle seat (maximally preventing crush of the cushion material) by the protruding portion.

In addition, the cushion material and the protruding portion may be integrally molded from elastically stretchable resin. Accordingly, the skin material can be fitted into the groove parts in such a way to provide better appearance while reducing manufacturing cost of the seat.

In addition, the external portion of the corner part may include an upper surface of the cushion material and an inner surface of the groove part.

DETAILED DESCRIPTION

Hereinafter, illustrative embodiments of the present invention will be described by referring to FIGS. 1 to 8. In each of FIGS. 1 to 8, a front side of a vehicle seat is referred to as F, a rear side thereof is referred to as R, an upper side thereof is referred to as UP, and a lower side thereof is referred to as DW, as necessary.

Figure 1:
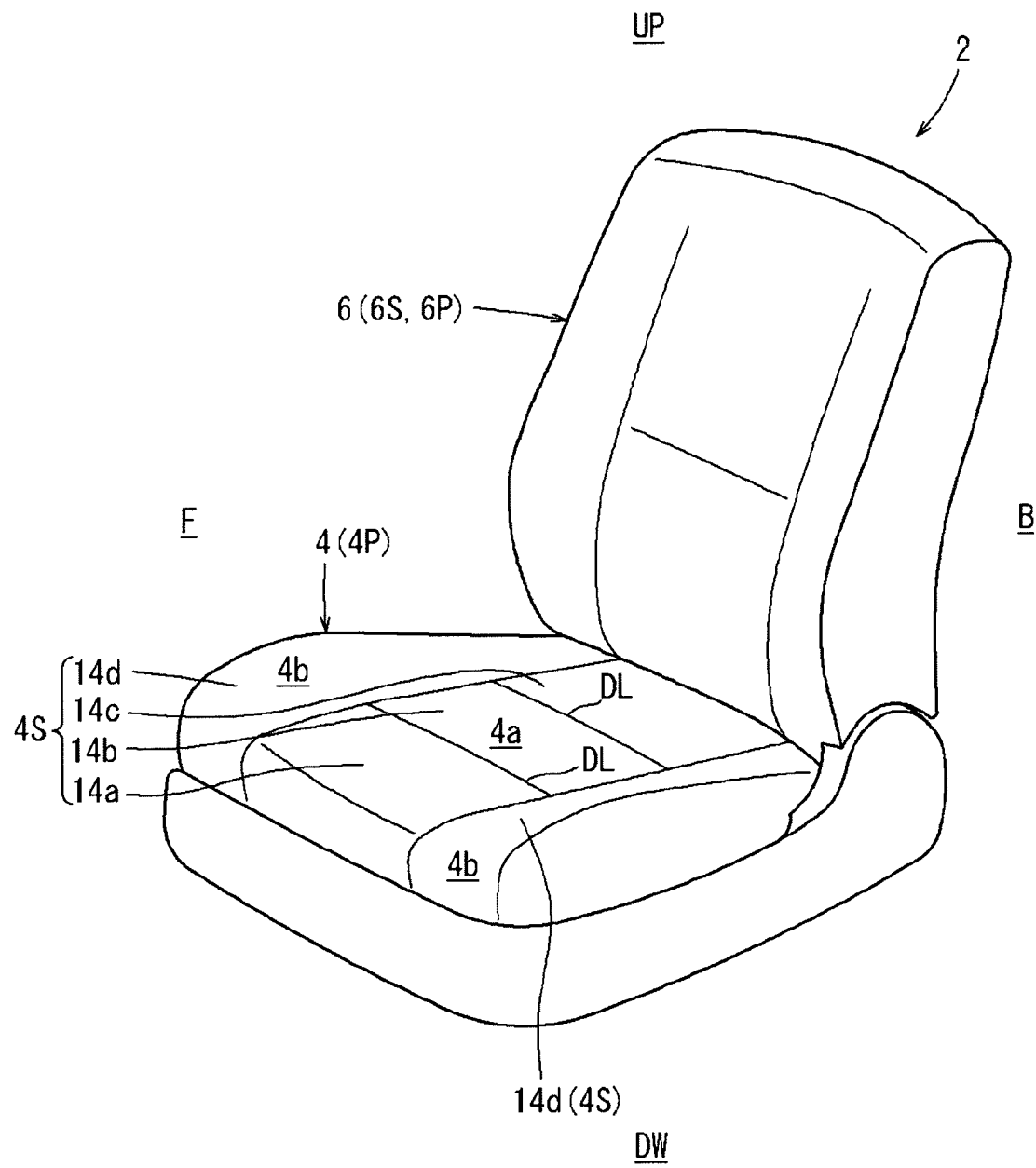
FIG. 1 is a perspective view of a vehicle seat.

A vehicle seat 2 in FIG. 1 includes a seat cushion 4 and a seat back 6. These components of the vehicle seat respectively include a cushion material (4P, 6P) forming an external shape of the vehicle seat and a skin material (4S, 6S) covering the cushion material.

First Illustrative Embodiment

Figure 2:
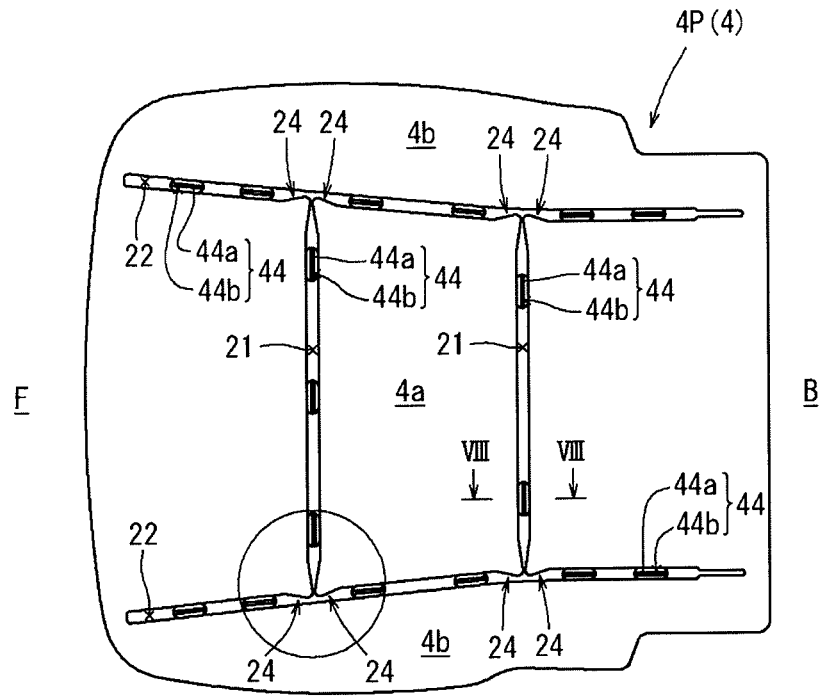
FIG. 2 is a top plan view of a cushion material.

The seat cushion 4 according to the present embodiment includes the skin material 4S, the cushion material 4P (groove parts 21, 22 and corner parts 24) and an engagement structure (see, FIGS. 1 and 2). Details of each component will be described later.

A portion of the skin material 4S is engaged inside a plurality of groove parts 21 22 in a pulled state while covering the cushion material 4P with the skin material 4S.

In this kind of seat configuration, it is desirable that a portion of the skin material 4S is fitted into the plural groove parts 21, 22 (especially, corner part 24) in a pulled state while maximally maintaining the appearance of the vehicle seat.

Accordingly, the present embodiment has a configuration by which a portion of the skin material 4S can be fitted into the plural groove parts 21, 22 in a pulled state while maximally maintaining the appearance of the vehicle seat. Hereinafter, the configuration will be described in detail.

<Skin Material>

The skin material 4S includes a plurality of skin pieces (first piece 14a, second piece 14b, third piece 14c and a pair of fourth pieces 14d) and an engaging part 42 described later (see, FIGS. 1 and 8).

Each of the first piece 14a to the third piece 14c is a member for respectively covering a central portion (a seated part 4a described later) of the cushion material 4P. In the present embodiment, the first piece 14a covers a front part of the central portion, the second piece 14b covers a middle part of the central portion and the third piece 14c covers a rear part of the central portion.

Further, each of the pair of fourth pieces 14d is a member for respectively covering a side part (bank part 4b described later) of the cushion material 4P.

Figure 8:
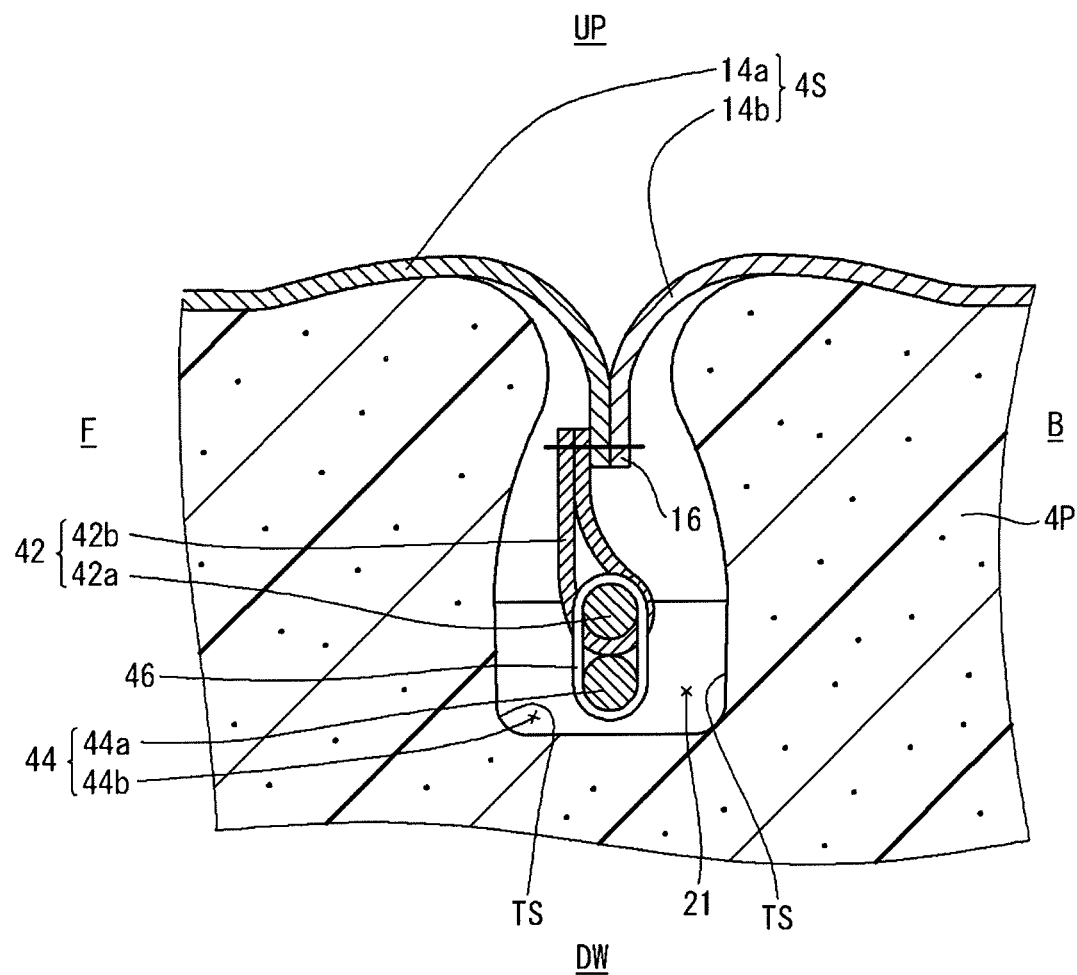
FIG. 8 is a sectional view taken along line VIII-VIII of FIG. 2.

In the present embodiment, ends of the pieces adjacent to each other are folded back inwardly in an overlapping manner to form a folded-back portion 16 (see, FIG. 8). The folded-back portion 16 (a portion of the skin material) protrudes inwardly of the seat and extends linearly in a width direction or a front-rear direction of the seat. The folded-back portion 16 is engaged in the plurality of groove parts 21, 22 in a suspending manner by an engagement structure described later.

<Cushion Material>

The cushion material 4P includes the seated part 4a, a pair of bank parts 4b, a plurality of groove parts 21, 22, a corner part 24 and an engaged part 44 described later (see, FIGS. 1, 2 and 8).

The seated part 4a is a flat site (having an approximately rectangular shape as viewed from the upper side) on which a passenger can sit and can be formed at a center of the seat cushion 4. Further, the pair of bank parts 4b is a convex site provided at both sides of the seat cushion 4 and can support the side part of the passenger during cornering of a vehicle.

The material of the cushion material 4P is not particularly limited, but it is desirable that elastically stretchable resin is used. Polyurethane foam (density: 10 kg/m$^3$ to 60 kg/m$^3$) can be used as an example of such a resin.

(Groove Part)

Figure 3:
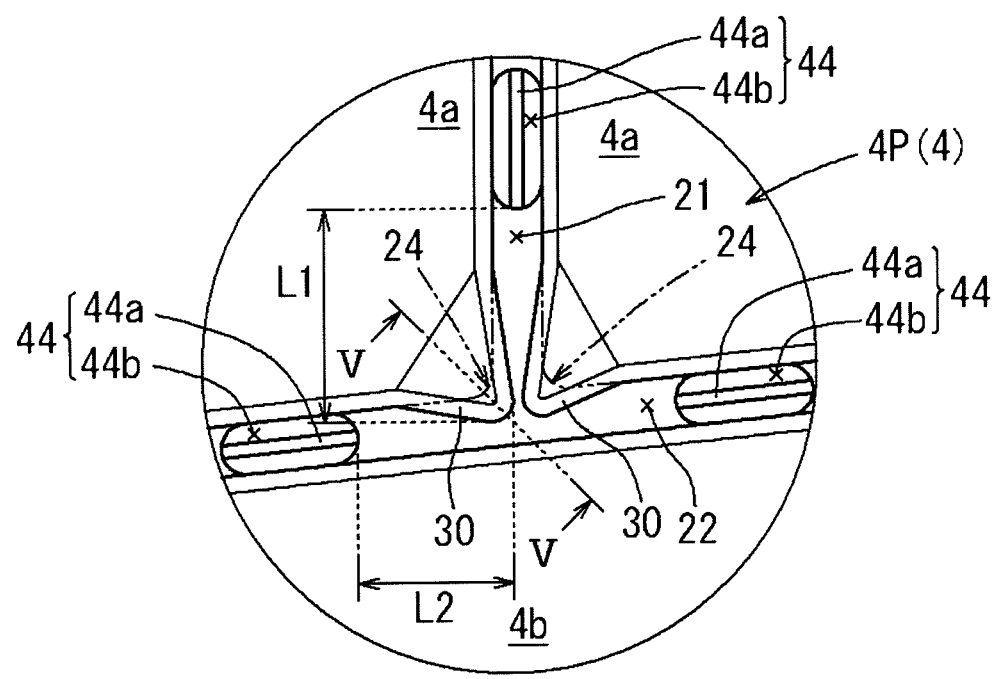
FIG. 3 is a top plan view of a portion of the cushion material which corresponds to the circle portion of FIG. 2.

Each of the plurality of groove parts (first groove part 21, second groove part 22) is a linear recess and can be formed at a seating side (upper surface side) of the cushion material 4P (see, FIGS. 2 and 3).

The first groove part 21 is a recess extending in a width direction of the seat and the second groove part 22 is a recess extending in front and rear directions of the seat.

In the present embodiment, a pair of second groove parts 22 is respectively formed between the seated part 4a and the bank part 4b. Further, a pair of first groove part 21 is respectively formed across the seated part 4a and both ends thereof respectively communicate with the second groove parts 22. In this way, a corner part 24 described later is formed.

(Corner Part)

Figure 4:
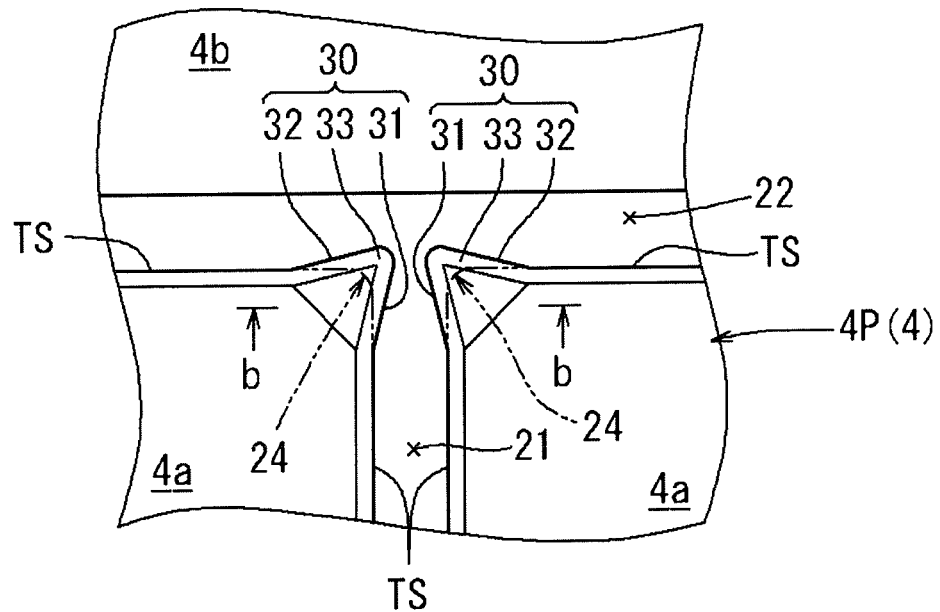
FIG. 4 (*a*) is a top plan view of a portion of the cushion material and FIG. 4 (*b*) is a sectional view taken along line b-b of FIG. 4 (*a*)
Figure 4:
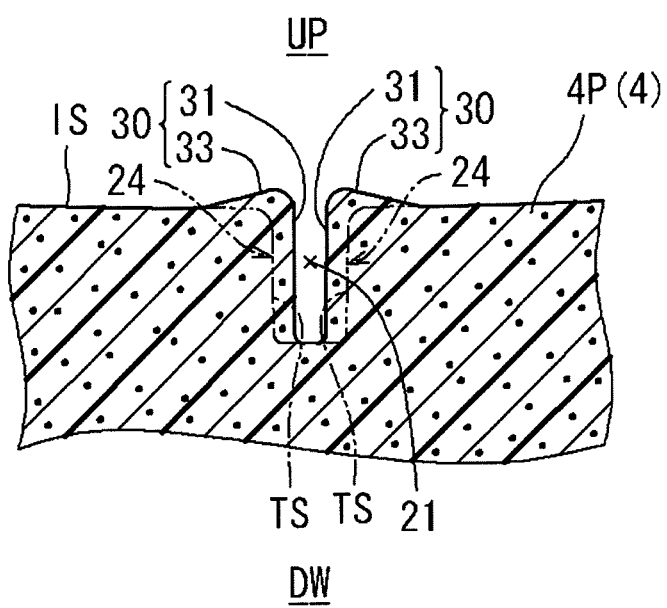

The corner part 24 is formed by intersection of the first groove part 21 and the second groove part 22 (see, FIGS. 2 to 4). In other words, the corner part 24 is defined by the intersection of the first groove part 21 and the second groove part 22.

In the present embodiment, the first groove part 21 is perpendicularly joined to the middle portion of the second groove part 22, that is, forms a T-shaped path with the second groove part. In this way, a pair of corner parts 24 is formed symmetrically with the first groove part 21 therebetween.

The external portion of each corner part 24 has a triangular shape (as viewed from the plan view) and the inner surface TS of the first groove part 21 and the inner surface TS of the second groove part 22 are joined to each other substantially at a right angle (see, FIG. 4 (a)). Further, the external portion of the corner part 24 has a triangular shape (as viewed from the sectional view) and the upper surface IS of the cushion material and the inner surface TS of each groove part are joined to each other substantially at a right angle (see, FIG. 4 (b)).

(Protruding Portion)

Figure 5:
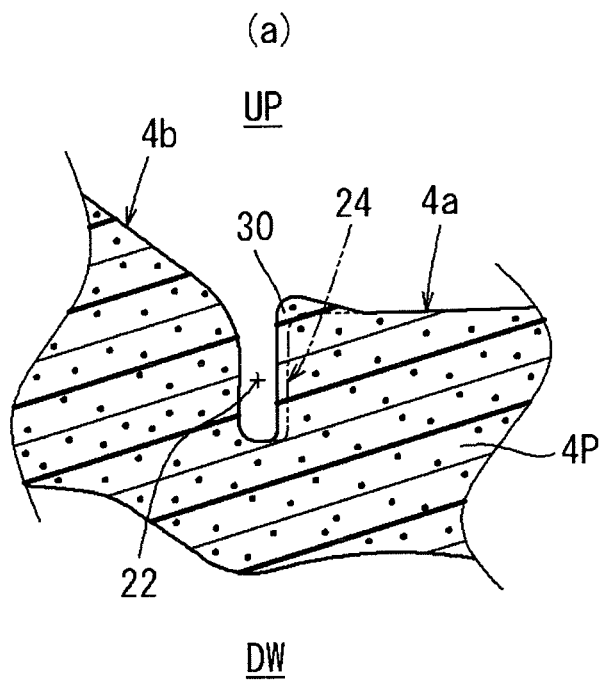
FIG. 5 (*a*) is a sectional view taken along line V-V of FIG. 3 and FIG. 5 (*b*) is a view illustrating a state where the cushion material is covered with a skin material.
Figure 5:
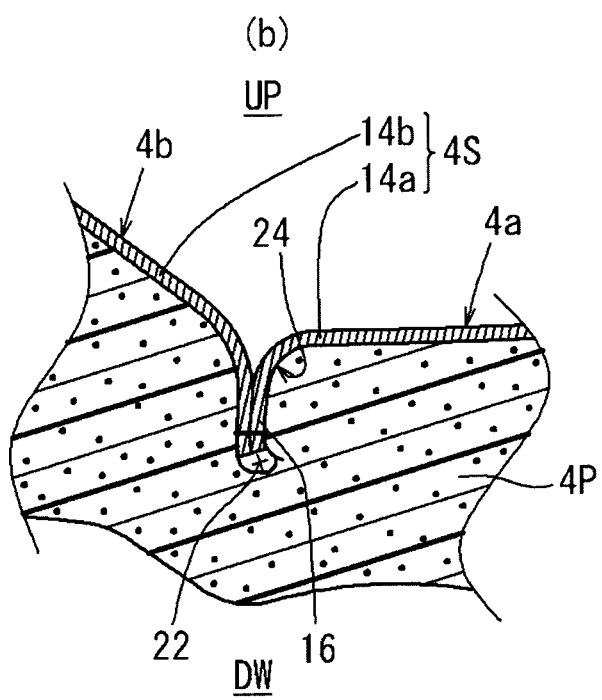

The protruding portion 30 protrudes from the external portion (upper surface IS of the cushion material, inner surface TS of the groove part) of the corner part 24 and can cover the external portion (e.g., continuously cover the external portion without interruption) (see, FIGS. 3 to 5).

The protruding dimension (i.e., expected crush amount of the cushion material) of the protruding portion 30 is not particularly limited. Typically, the protruding dimension is suitably set depending on the tension of the skin material 4S.

In the present embodiment, a pair of protruding portions 30 (having triangular shape as viewed from the upper side) of the corner part 24 are arranged to oppose each other and protrude into the first groove part 21 while peaks thereof approach to each other (i.e. protrude toward the center of a T-shaped path).

The protruding portion 30 can be elastically stretched. Further, the protruding portion 30 can shrink toward the external portion of the corner part 24 by a pressing force of the skin material 4S when being fitted into the cushion material in a pulled state (see, FIG. 5).

Although fabric (woven fabric, knitting fabric or non-woven fabric) or resin can be used as a material of the protruding portion 30, it is desirable that the same material as the cushion material 4P is used. In the present embodiment, the cushion material 4P and the protruding portion 30 can be integrally molded from polyurethane foam (elastically stretchable resin).

[External Shape of the Protruding Portion]

The external shape of the protruding portion 30 is not particularly limited. For example, the protruding portion 30 in the present embodiment has a triangular external shape (as viewed from the plan view and as viewed from the sectional view) and includes a plurality of side portions 31, 32, 33 which are continuously formed without an interruption (see, FIGS. 3 and 4).

The external shape of the protruding portion 30 as viewed from the plan view is defined by first side portion 31 and the second side portion 32 (see, FIG. 4 (*a*)). The first side portion 31 protrudes from the first groove part 21 (the inner surface TS of the groove part) in a slant manner and the second side portion 32 protrudes from the second groove part 22 (the inner surface TS of the groove part) in a slant manner. The first side portion 31 and the second side portion 32 can be arranged in an axisymmetric manner across V-V line (line dividing the corner part in a bilaterally symmetrical manner) in FIG. 3.

Further, the external shape of the protruding portion 30 as viewed from the sectional view is defined by the first side portion 31 (or the second side portion) and the third side portion 33 (see, FIG. 4 (*b*)). The third side portion 33 protrudes from the upper surface (IS) of the cushion material in a slant manner and the first side portion 31 protrudes from the first groove part 21 (the inner surface TS of the groove part) in a parallel manner. Since a groove width dimension of each groove part 21, 22 (as viewed from the sectional view) becomes narrower due to the protruding portion 30, the falling out of the folded-back portion 16 is prevented or reduced (see, FIG. 5).

First Modified Embodiment

Figure 6:
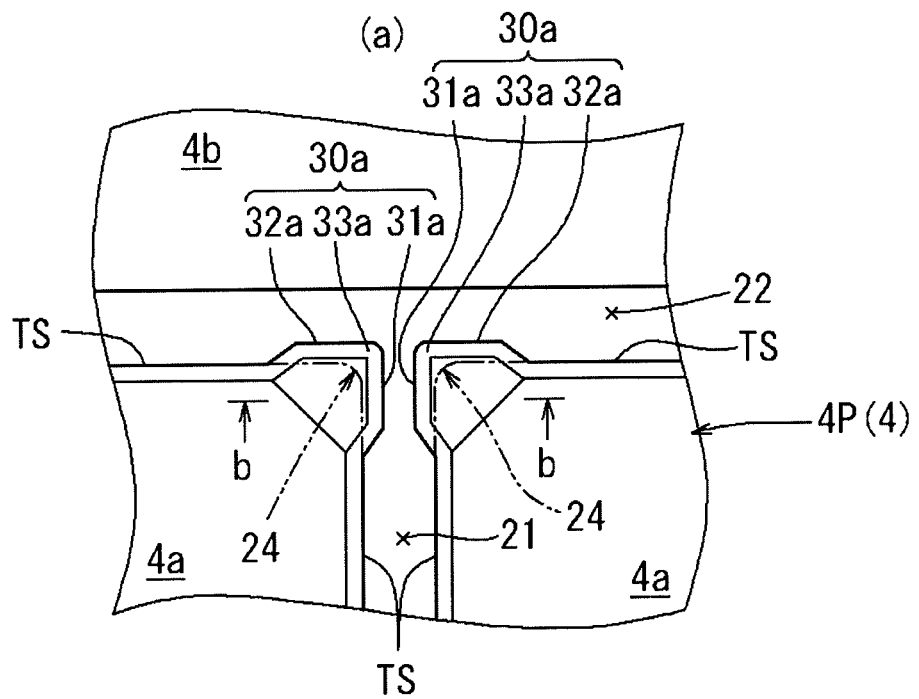
FIG. 6 (*a*) is a top plan view of a portion of a cushion material according to a first modified embodiment and FIG. 6 (*b*) is a sectional view taken along line b-b of FIG. 6 (*a*)
Figure 6:
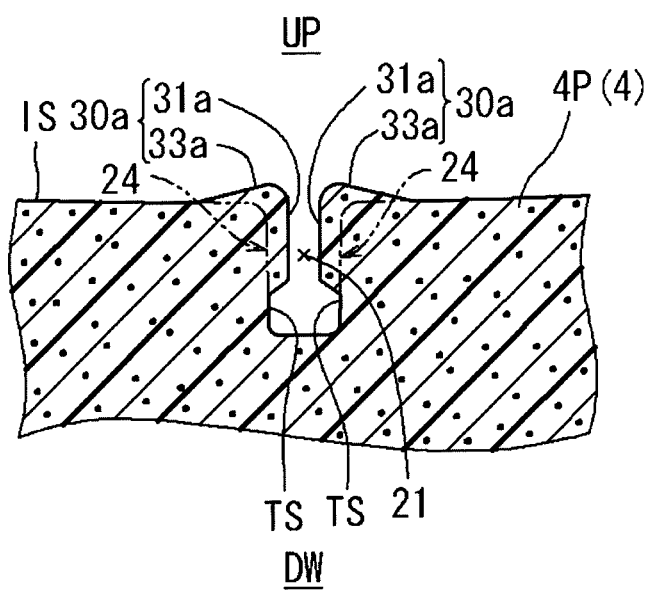

In the first modified embodiment, the external portion of a protruding portion 30*a* (as viewed from the plan view) is substantially similar to the corner part 24 (see, FIG. 6).

The external shape of the protruding portion 30*a* as viewed from the plan view includes a first side portion 31*a* and a second side portion 32*a*. The first side portion 31*a* protrudes from the first groove part 21 (TS) in a parallel manner and the second side portion 32*a* protrudes from the second groove part 22 (TS) in a parallel manner.

Further, the external shape of the protruding portion 30*a* as viewed from the sectional view includes the first side portion 31*a* and a third side portion 33*a*, for example. The third side portion 33*a* protrudes from the upper surface (IS) of the cushion material in a slant manner and the first side portion 31*a* protrudes only from the upper portion of the first groove part 21 (TS) in a parallel manner. Since a groove width dimension of each groove part 21, 22 is wide at its lower side, an engagement structure described later can be provided.

Second Modified Embodiment

Figure 7:
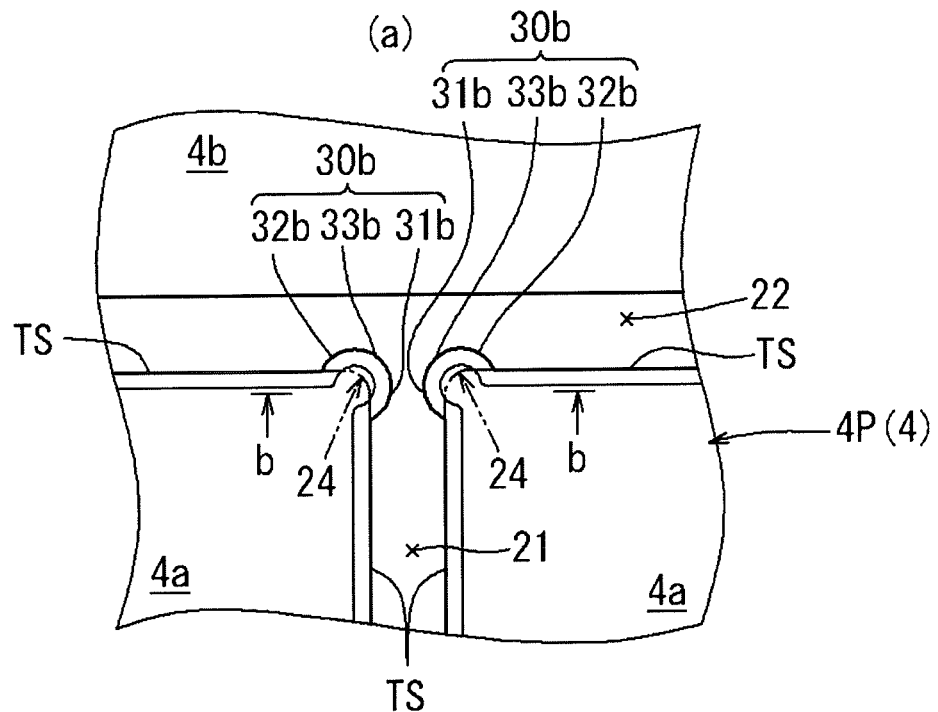
FIG. 7 (*a*) is a top plan view of a portion of a cushion material according to a second modified embodiment and FIG. 7 (*b*) is a sectional view taken along line b-b of FIG. 7 (*a*)
Figure 7:
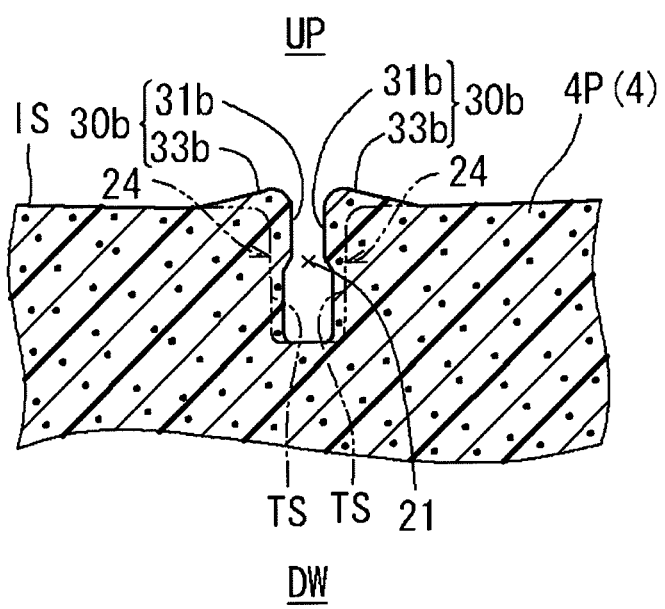

Further, in the second modified embodiment, the external portion of the protruding portion 30*b* (as viewed from the plan view) has a substantially circular shape (see, FIG. 7).

The external shape of the protruding portion 30*b* as viewed from the plan view includes a first side portion 31*b* and a second side portion 32*b*. The first side portion 31*b* protrudes from the first groove part 21 (TS) in an arc manner and the second side portion 32*b* protrudes from the second groove part 22 (TS) in an arc manner.

Further, the external shape of the protruding portion 30*b* as viewed from the sectional view includes the first side portion 31*b* and a third side portion 33*b*, for example. The third side portion 33*b* protrudes from the upper surface (IS) of the cushion material in a slant manner. Further, the first side portion 31*b* protrudes from the upper portion of the first groove part 21 (TS) in a parallel manner. The protruding dimension at an upper side of the first side portion is larger than the protruding dimension at a lower side thereof. Since a groove width dimension of each groove part 21, 22 is wide at its lower side, an engagement structure described later can be provided.

[Engagement Structure]

The engagement structure includes an engaging part 42, an engaged part 44 and a ring member 46 (see, FIGS. 2, 3 and 8). The ring member 46 is formed in a substantially C-shape and can be closed (into a substantially O-shape) by a tool.

Further, the engaging part 42 has a first wire material 42*a* and a fabric material 42*b* (see, FIG. 8). The first wire material 42*a* (rod material) has a length dimension such that the first wire material can be arranged along the folded-back portion 16. Further, the fabric material 42*b* is a band-like member that can be arranged along the folded-back portion 16.

In the present embodiment, the fabric material 42*b* is adhered to the ends (the folded-back portion 16) of the first piece 14*a* and the second piece 14*b* while being folded inwardly. And then, the first wire material 42*a* is inserted inside of the fabric material 42*b* and extends in a width direction of the seat.

The engaged part 44 has a second wire material 44*a* and a recessed portion 44*b* (see, FIGS. 2, 3 and 8). The second wire material 44*a* is a rod-like member that can be arranged in the recessed portion 44*b*. The recessed portion 44*b* is a recessed region provided in a lower surface of each groove part 21, 22.

The second wire material 44*a* is disposed in the first groove part 21 (the recessed portion 44*b*) so as to be able to face the first wire material 42*a*. Further, the second wire material 44*a* is disposed in the second groove part 22 (the recessed portion 44*b*) so as to be able to face the first wire material 42*a*.

In the present embodiment, the plurality of recessed portions 44*b* can be formed in each groove part 21, 22 (see, FIGS. 2 and 3). At this time, the recessed portion 44*b* is formed at a region of the first groove part 21 adjacent to the corner part 24, that is, a region of the first groove part 21 spaced apart from the corner part 24 by a spacing distance L1. In addition, the recessed portion 44*b* is formed at a region of the second groove part 22 adjacent to the corner part 24, that is, a region of the second groove part 22 spaced apart from the corner part 24 by a spacing distance L2.

It is desirable that the spacing distance L1 and the spacing distance L2 are set equal to each other when the first side portion 31 and the second side portion 32 are arranged in an axisymmetric manner (see, FIGS. 3 and 4). By doing so, the tension exerted on the first side portion 31 and the second side portion 32 is substantially the same when the skin material 4S is fitted in the cushion material in a pulled state.

As the spacing length L1 (the spacing distance L2) becomes longer, it is possible to reduce the protruding dimension of the protruding portion 30.

[Covering Work of the Skin Material]

Referring to FIGS. 2 to 5 and FIG. 8, the cushion material 4P is covered with the skin material 4S in such a way that the folded-back portion 16 is engaged inside the plurality of groove parts 21, 22 in a pulled manner. The folded-back portion 16 (the engaging part 42) is engaged with the engaged part 44 via the ring member 46. At this time, excessive tension may be exerted on the corner part 24.

Accordingly, in the present embodiment, the protruding portion 30 is pressed by the skin material 4S and thus shrunk toward the external shape of the corner part 24. In this way, it is possible to fit the folded-back portion 16 in each of the groove parts 21, 22 in pulled state while maximally suppressing excessive crush of the corner part 24 of the cushion material 4P (see, FIG. 5).

Further, sharp design lines DL (so-called, design lines having no angular sense) can be formed on a surface of the seat cushion 4 by continuously forming the protruding portion 30 without an interruption. As a result, the seat has an excellent design (see, FIG. 1).

According to the present embodiment as mentioned above, it is possible to maximally suppress the crush of the corner part 24 of the cushion material 4P by the protruding portion 30.

Further, according to the present embodiment, the protruding portion 30 (expected crush of the cushion material) can be formed without requiring significant design change of the cushion material 4P. Accordingly, the present invention can be applied to various vehicle seats. In addition, according to the present embodiment, the design change of the skin material 4S is not necessary. For example, an additional member for preventing wrinkles is not necessary. Accordingly, the configuration of the seat becomes simple.

Further, in the present embodiment, the cushion material 4P and the protruding portion 30 are integrally molded from elastically stretchable resin. Accordingly, the folded-back portion 16 can be fitted into the groove parts in a pulled state in such a way to provide better appearance while reducing manufacturing cost of the seat.

In this way, according to the present embodiment, it is possible to fit the folded-back portion 16 (a portion of the skin material) into each groove part 21, 22 in a pulled state while maximally maintaining the appearance of the seat.

The vehicle seat 2 according to the present embodiment is not limited to the above-described embodiments and may be realized in various other embodiments.

(1) Although an example of the engagement structure has been illustratively described in the above-described embodiments, the example is not intended to limit the configuration of the engagement structure. For example, the engaging part 42 and the engaged part 44 may be coupled to each other by a clip.

(2) Further, the protruding portion 30 may be provided to all of the plurality of corner parts 24 or may be provided to at least one of the plurality of corner parts 24.

(3) Further, although the seat cushion 4 has been described as an example of the seat component in the above-described embodiment, the configuration of the above-described embodiment can also be applied to other various seat components, for example, the seat back 6.

What is claimed is:

1. A vehicle seat comprising:
    a seat having a supporting surface, the supporting surface including:
        a cushion material forming an outer shape of the vehicle seat,
        a plurality of groove parts formed in the cushion material and intersecting each other,
        each of a plurality of corner parts being formed by intersecting sides that define the plurality of groove parts, and
        a skin material covering the cushion material,
        wherein the skin material covers the cushion material while a portion of the skin material is engaged inside the plurality of groove parts in a pulled state,
        wherein the cushion material includes at least two protruding portions opposing each other, wherein each of the at least two protruding portions protrude into at least a same one of the plurality of groove parts, from an external portion of a respective one of the corner parts, in a plan view of the supporting surface, and
        wherein each of the at least two protruding portions has at least a side portion that is formed on two intersecting sides, among the intersecting sides, of a respective one of the corner parts so as to cover the external portion of the respective one of the corner parts,
    wherein each of the at least two protruding portions shrinks toward the external portion of the respective one of the corner parts by a pressing force of the skin material engaged inside the plurality of groove parts in the pulled state, and
    wherein at least part of the side portion that protrudes into one of the plurality of groove parts intersects a bottom surface of the one of the plurality of groove parts such that an exterior face of the at least part of the side portion is spaced apart from the intersecting sides of the groove parts.

2. The vehicle seat according to claim 1,
    wherein the cushion material and the at least two protruding portions are integrally molded from elastically stretchable resin.

3. The vehicle seat according to claim 1,
    wherein the external portion of the corner parts include an upper surface of the cushion material and an inner surface of a corresponding one of the plurality of groove parts.

4. The vehicle seat according to claim 1, wherein the at least two protruding portions protrude at a position where the plurality of groove parts intersect with each other.

5. A vehicle seat comprising:
    a seat having a supporting surface, the supporting surface including:
        a cushion material having a plurality of groove parts intersecting each other and each of a plurality of corner parts defined by intersecting sides that define the plurality of groove parts,
        an engagement part provided inside a corresponding one of the plurality of groove parts, and
        a skin material covering the cushion material while a portion of the skin material is fitted into the corresponding one of the plurality of groove parts in a pulled state, the skin material engaging with the engagement part,
    wherein the cushion material includes at least two protruding portions opposing each other,
    wherein each of the at least two protruding portions protrude into at least a same one of the plurality of groove parts, from an external portion of a respective one of the corner parts, in a plan view of the supporting surface, and
    wherein each of the at least two protruding portions has at least a side portion that is formed on two intersecting sides, among the intersecting sides, of a respective one of the corner parts so as to cover the external portion of the respective one of the corner parts,
    wherein each of the at least two protruding portions shrinks toward the external portion of the respective one of the corner parts by a pressing force of the skin material, and
    wherein at least part of the side portion that protrudes into one of the plurality of groove parts intersects a bottom surface of the one of the plurality of groove parts such that an exterior face of the at least part of the side portion is spaced apart from the intersecting sides of the groove parts.

6. The vehicle seat according to claim 5,
    wherein the cushion material and the at least two protruding portions are integrally molded from elastically stretchable resin.

7. The vehicle seat according to claim 5,
wherein the external portion of the corner parts include an upper surface of the cushion material and an inner surface of the corresponding one of the plurality of groove parts.

8. The vehicle seat according to claim 5, wherein the at least two protruding portions protrude at a position where the plurality of groove parts intersect with each other.

\* \* \* \* \*